(12) United States Patent
Teramoto

(10) Patent No.: US 9,083,094 B2
(45) Date of Patent: Jul. 14, 2015

(54) JOINT CONNECTOR

(71) Applicant: Sumitomo Wiring Systems, Ltd., Yokkaichi, Mie (JP)

(72) Inventor: Keisuke Teramoto, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 14/103,012

(22) Filed: Dec. 11, 2013

(65) Prior Publication Data

US 2014/0187081 A1 Jul. 3, 2014

(30) Foreign Application Priority Data

Dec. 27, 2012 (JP) ................................. 2012-284767

(51) Int. Cl.
*H01R 4/64* (2006.01)
*H01R 4/34* (2006.01)
*F16B 5/02* (2006.01)
*F16B 1/00* (2006.01)

(52) U.S. Cl.
CPC .. *H01R 4/64* (2013.01); *H01R 4/34* (2013.01); *F16B 5/025* (2013.01); *F16B 2001/0092* (2013.01); *H01R 2201/26* (2013.01)

(58) Field of Classification Search
CPC .................................. H01R 4/64; H01R 31/08
See application file for complete search history.

(56) References Cited

U.S. PATENT DOCUMENTS

| 5,433,628 | A | * | 7/1995 | Sadaishi et al. ............... 439/736 |
| 5,496,188 | A | * | 3/1996 | Okamura et al. ............. 439/189 |
| 5,788,519 | A | * | 8/1998 | Stern .............................. 439/189 |
| 6,280,263 | B1 | * | 8/2001 | Manor et al. .................. 439/801 |
| 6,431,880 | B1 | * | 8/2002 | Davis et al. .................. 439/76.2 |
| 6,607,392 | B2 | * | 8/2003 | Kondoh .......................... 439/92 |
| 6,875,053 | B2 | * | 4/2005 | Fujii et al. ..................... 439/567 |
| 6,878,017 | B2 | * | 4/2005 | Sakurai et al. ................ 439/723 |
| 7,081,589 | B1 | * | 7/2006 | Advey et al. .................... 174/78 |
| 7,476,113 | B2 | * | 1/2009 | Tamagawa et al. ........... 439/189 |
| 7,581,966 | B2 | * | 9/2009 | Shigehisa et al. .............. 439/98 |
| 7,883,362 | B2 | * | 2/2011 | Ichio et al. .................... 439/511 |
| 7,990,738 | B2 | * | 8/2011 | Urrea et al. ................... 361/833 |
| 8,025,538 | B2 | * | 9/2011 | Hara et al. .................... 439/723 |
| 8,100,730 | B2 | * | 1/2012 | Hara et al. .................... 439/721 |
| 8,105,103 | B2 | * | 1/2012 | Nishio et al. ................. 439/287 |
| 8,137,116 | B2 | * | 3/2012 | Omori et al. .................... 439/92 |
| 8,337,251 | B2 | * | 12/2012 | Ecker ....................... 439/620.27 |
| D710,806 | S | * | 8/2014 | Tsukamoto ................. D13/147 |
| 8,851,936 | B2 | * | 10/2014 | Gale et al. ..................... 439/709 |
| 8,870,610 | B2 | * | 10/2014 | Tsuji ............................. 439/874 |
| 2007/0072455 | A1 | * | 3/2007 | Onuma et al. .................. 439/98 |
| 2007/0246241 | A1 | * | 10/2007 | Peterson et al. ............ 174/74 R |

(Continued)

Primary Examiner — Ross Gushi
(74) Attorney, Agent, or Firm — Gerald E. Hespos; Michael J. Porco; Matthew T. Hespos

(57) ABSTRACT

A joint connector (10) collectively connects wires to a body (B) of a vehicle. The joint connector (10) has a conductive plate (30) with a main body (31) including a plurality of terminals (32B) to be connected to female terminals at ends of the wires and to be bolt-fastened to the body (B). A housing (20) is arranged around the terminals (32B). The conductive plate (30) includes a coupling portion (32A) for coupling the terminals (32B) to each other, a bolt fastening portion (34) with a bolt hole (35) through which a ground bolt (B2) is to be inserted, a rotation preventing piece (33) at a side of the bolt fastening portion (34) opposite to the coupling (32A) to prevent rotation of the main body (31), and ribs continuous from the rotation preventing piece (33) to the coupling (32A) across the main body (31).

5 Claims, 7 Drawing Sheets

(56) References Cited

U.S. PATENT DOCUMENTS

| | | | |
|---|---|---|---|
| 2007/0264865 A1* | 11/2007 | Hagikura et al. | 439/493 |
| 2008/0244889 A1* | 10/2008 | Hagikura et al. | 29/426.5 |
| 2010/0071953 A1* | 3/2010 | Ichio et al. | 174/72 A |
| 2010/0261377 A1* | 10/2010 | Ecker | 439/507 |
| 2013/0323958 A1* | 12/2013 | Nakashima et al. | 439/350 |
| 2014/0187081 A1* | 7/2014 | Teramoto | 439/527 |
| 2014/0220792 A1* | 8/2014 | Omori et al. | 439/34 |
| 2014/0235090 A1* | 8/2014 | Omori et al. | 439/350 |
| 2014/0315410 A1* | 10/2014 | Omori et al. | 439/271 |
| 2014/0364009 A1* | 12/2014 | Kondo | 439/620.09 |
| 2014/0377975 A1* | 12/2014 | Omori et al. | 439/284 |

* cited by examiner

JOINT CONNECTOR

BACKGROUND

1. Field of the Invention

The invention relates to a joint connector.

2. Description of the Related Art

U.S. Pat. No. 8,100,730 discloses a joint connector for collectively connecting wires to a body of a vehicle. The joint connector has a plurality of male terminals to be connected to female terminals at ends of the wires. A coupling connects the male terminals to each other. A housing accommodates the male terminals and the coupling, and a busbar extends from the coupling toward the body of the vehicle. The busbar has a mounting hole through which a bolt is to be inserted, and a rotation preventing portion is provided on a peripheral edge of the mounting hole in the busbar to prevent rotation when the bolt is tightened. The rotation preventing portion is formed by bending a metal plate into an L shape and extends down from the peripheral part of the busbar and then bent at a right angle to laterally extend.

Ribs are formed on the above busbar from the coupling to the peripheral part of the mounting hole to enhance the strength of the busbar. However, no rib is formed on the rotation preventing portion. Thus, the rotation preventing portion may undergo deformation if a strong force is applied.

The invention was completed based on the above situation and aims to enhance the strength of a rotation preventing portion.

SUMMARY OF THE INVENTION

The invention is directed to a joint connector for collectively connecting wires to a body of a vehicle. The joint connector includes a conductive plate with a conductive plate main body that has terminal portions for connection to female terminals. The female terminals are connected to ends of the wires and are to be bolt-fastened to the conductive plate main body. A housing is arranged around the terminal portions. The conductive plate includes a coupling for coupling the terminals to each other. A bolt fastening portion is formed with a bolt hole through which a bolt is to be inserted, and a rotation preventing portion is provided at a side of the bolt fastening portion opposite to the coupling to prevent rotation of the conductive plate main body. A rib extends continuous through the conductive plate main body from the rotation preventing portion to the coupling. The rib enhances the strength of the rotation preventing portion and the conductive plate main body.

The rotation preventing portion may include a vertical portion that extends vertically from a peripheral edge of the conductive plate main body and the rib may be continuous from the vertical portion to the coupling through the conductive plate main body. Thus, the strength of the conductive plate main body can be enhanced from the vertical portion of the rotation preventing portion to the coupling.

The rotation preventing portion may include a horizontal portion that extend horizontally from an extending end of the vertical portion and the rib may be continuous from the horizontal portion to the coupling through the vertical portion and the conductive plate main body. Thus, the strength of the conductive plate main body can be enhanced from the horizontal portion of the rotation preventing portion to the coupling.

A part of the rib arranged on the rotation preventing portion preferably has a lower height than a part of the rib arranged on the conductive plate main body. A hole may be formed on the body and the rotation preventing portion may be inserted into the hole. The low height of the part of the rib arranged on the rotation preventing portion facilitates insertion of the rotation preventing portion into the hole of the body.

A part of the rib near the rotation preventing portion preferably has a moderately inclined tapered shape. Thus, a metal sheet will not become thinner by being pulled suddenly when press-working the metal sheet to form the conductive plate since the height of the rib does not suddenly change near the rotation preventing portion.

DETAILED DESCRIPTION OF THE PREFERRED EMBODIMENTS

Figure 1:
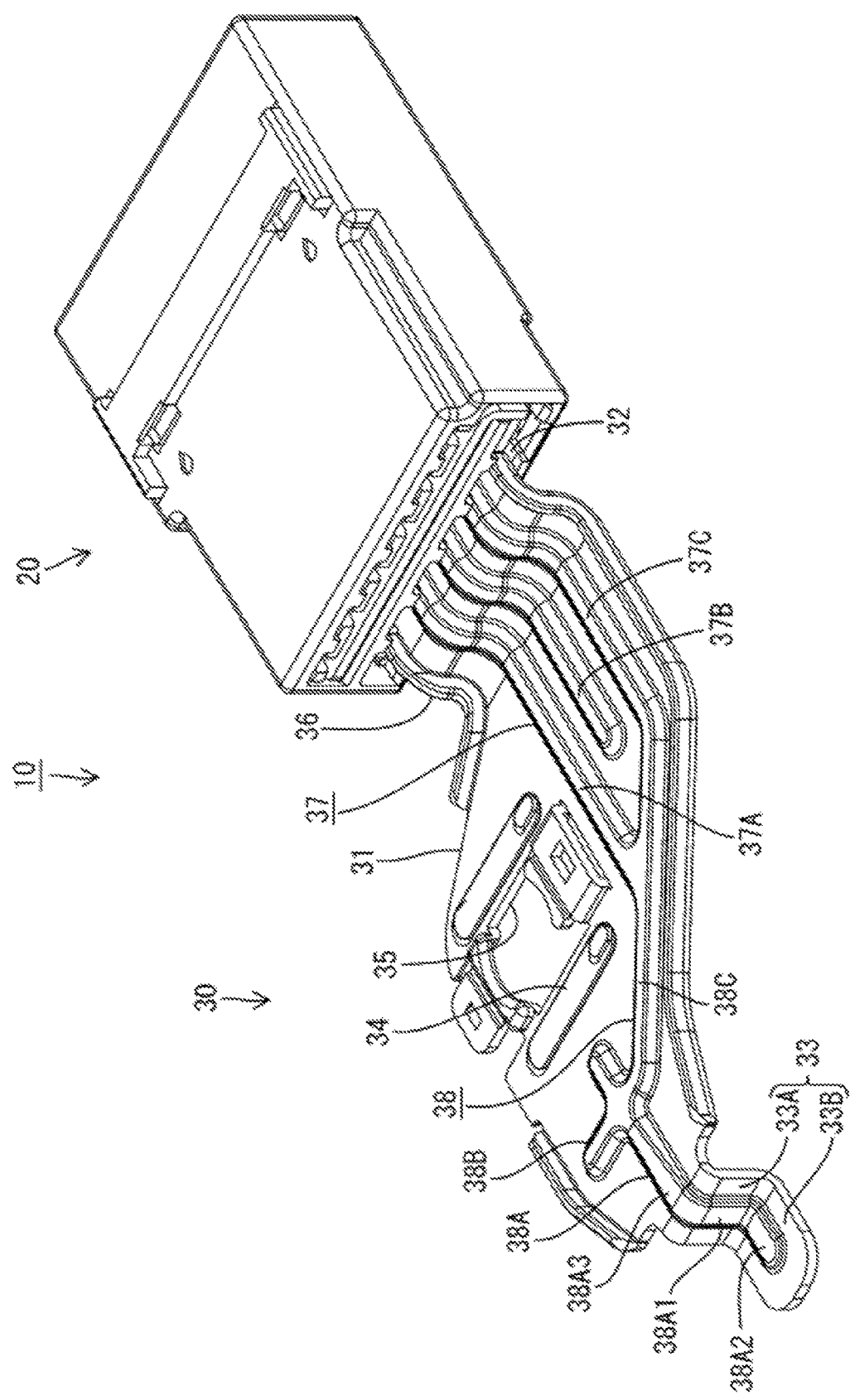
FIG. 1 is a perspective view of a joint connector.
Figure 7:
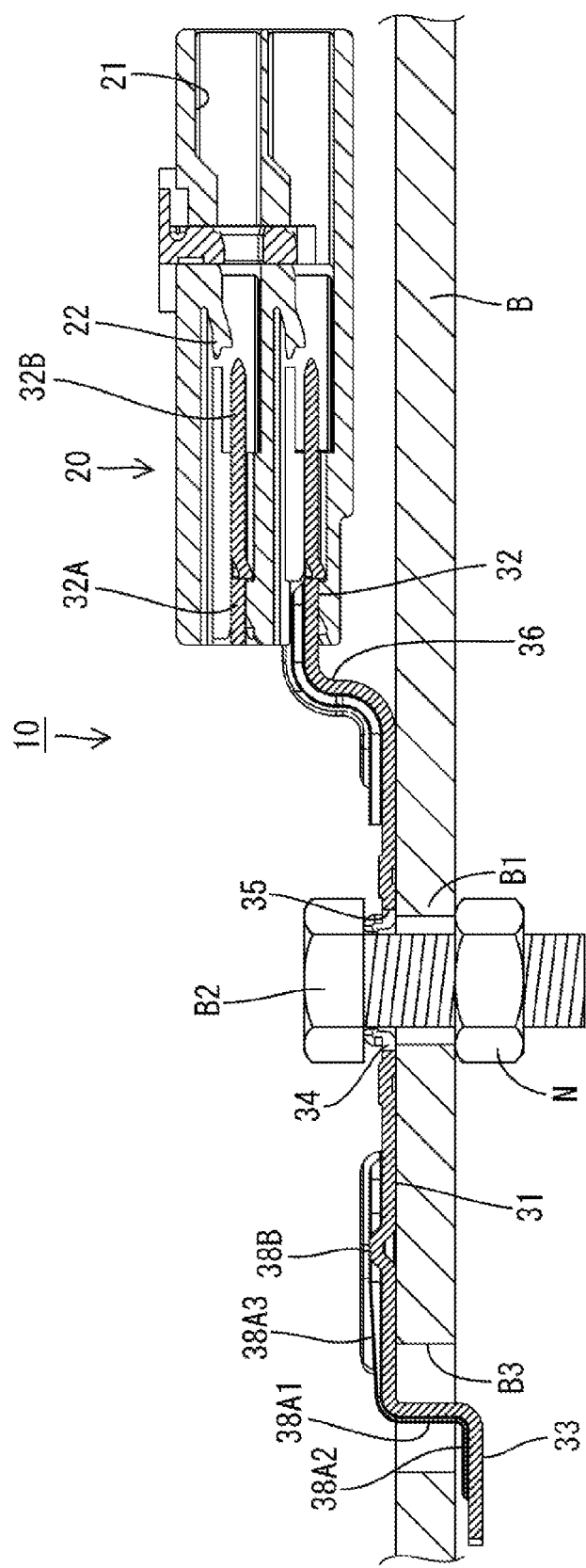
FIG. 7 is a section along A-A of FIG. 5 showing the joint connector bolt-fastened to a body of a vehicle.

A joint connector according to the illustrated embodiment of the invention is identified by the numeral 10 in FIGS. 1 to 7 for collectively connecting a plurality of wires to a body B of a vehicle. As shown in FIG. 1, the joint connector 10 has a housing 20 made of synthetic resin and a conductive plate 30. On the other hand, as shown in FIG. 7, the body B of the vehicle includes a grounding location B1 and a ground bolt B2 is insertable into this grounding location B1 from above. A nut N is fixed to a lower side of the grounding location B1 and the ground bolt B2 is engaged threadedly with the nut N.

Figure 3:
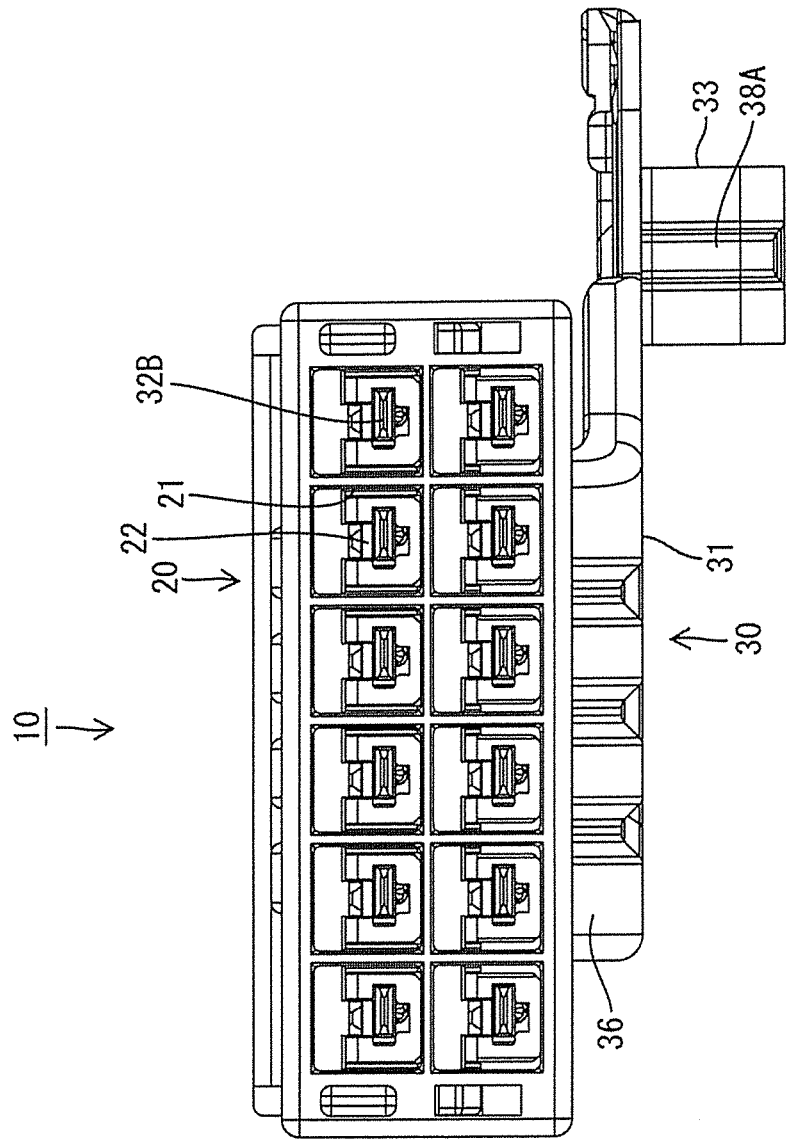
FIG. 3 is a front view of the joint connector.
Figure 4:
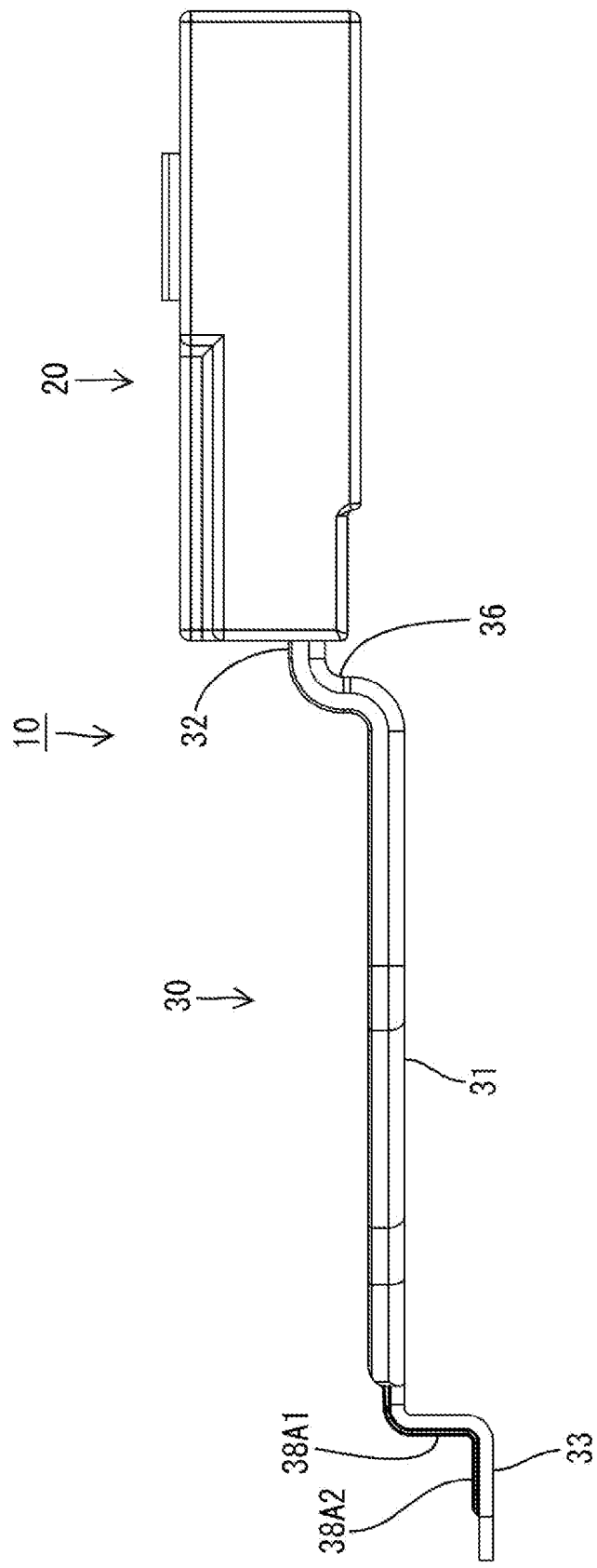
FIG. 4 is a side view of the joint connector.

Cavities 21 are formed in the housing 20 and are arranged side by side in a lateral direction in upper and lower rows, as shown in FIGS. 3 and 7. An upwardly deflectable locking lance 22 is cantilevered rearward from an inner upper surface of each cavity 21.

The conductive plate 30 is formed by press-working a metal plate with good electrical conductivity. This conductive plate 30 has plate main body 31, a connecting portion 32 on a front end of the main body 31 near the housing 20 and a rotation preventing piece 33 on a rear end of the main body 31 opposite to the housing 20, as shown in FIG. 1. Note that, in the description of the configuration of the conductive plate 30, a vertical direction is based on FIG. 3 and a width direction is based on a lateral direction shown in FIG. 3. Further, forward and backward directions are based on FIG. 4, wherein a leftward direction is a backward direction and a rightward direction is a forward direction.

Figure 5:
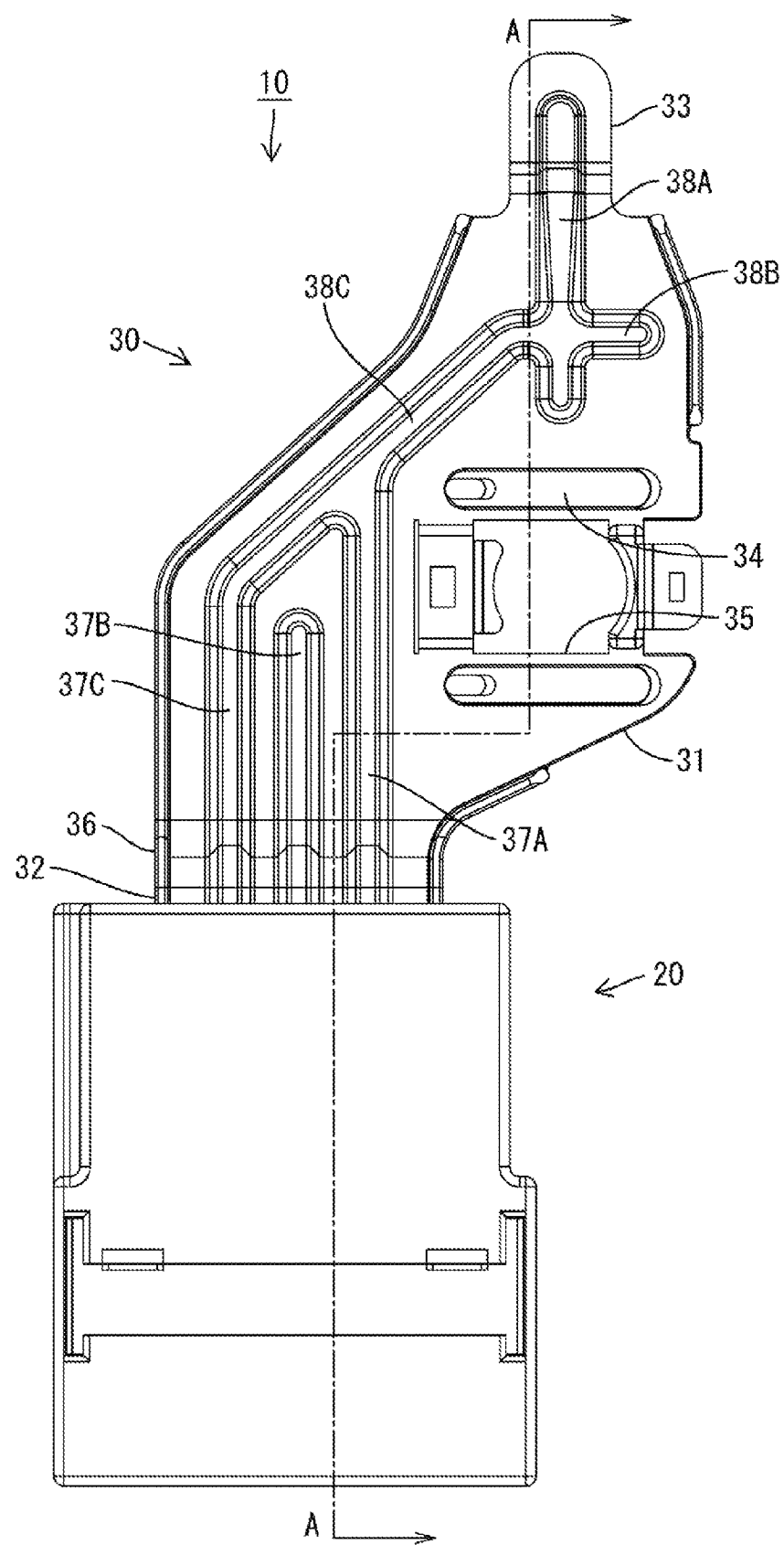
FIG. 5 is a plan view of the joint connector.
Figure 6:
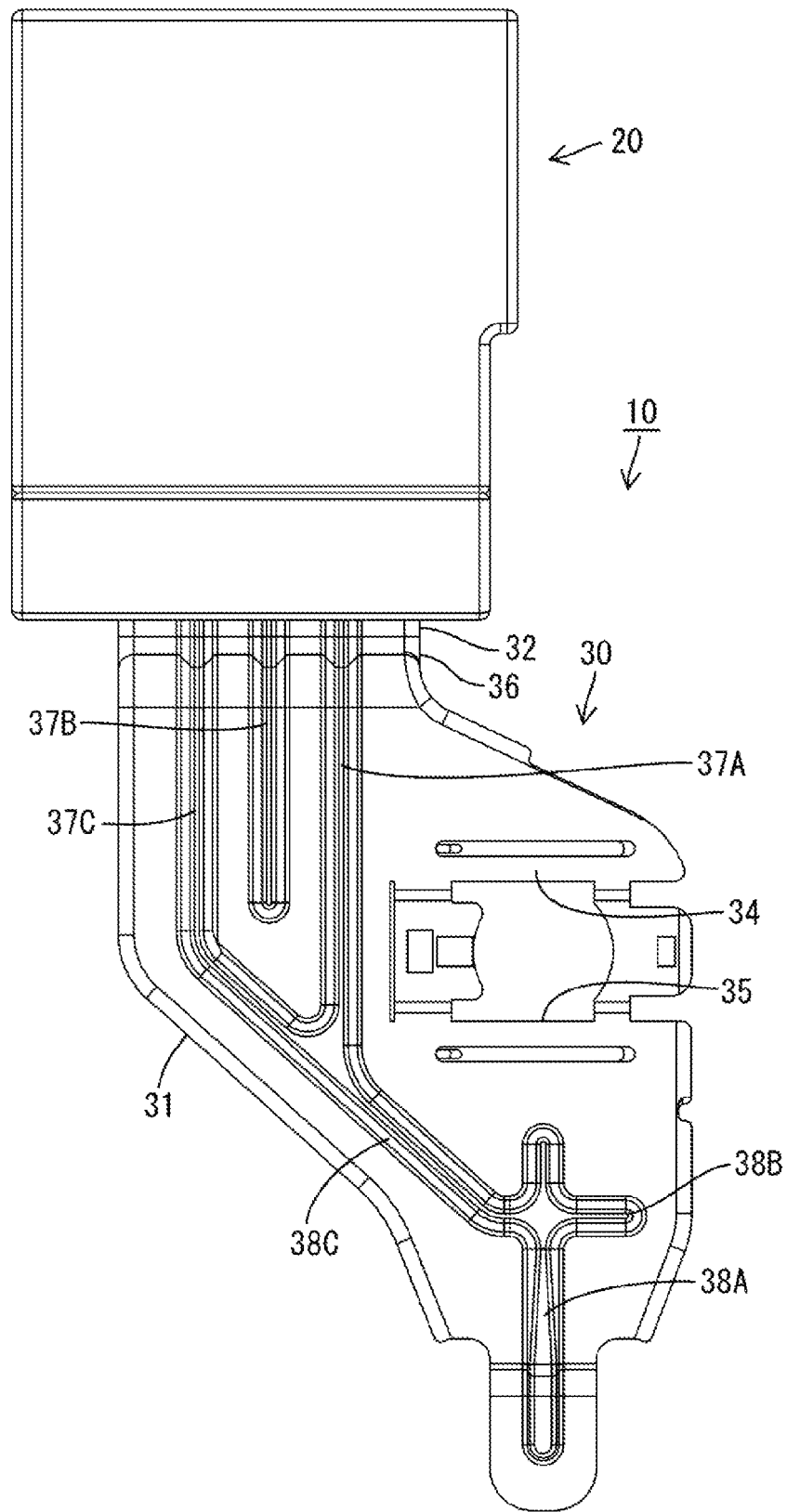
FIG. 6 is a bottom view of the joint connector.

As shown in FIG. 5, the rotation preventing piece 33 is arranged eccentrically with respect to the connecting portion 32 in the width direction. As shown in FIG. 1, this rotation preventing piece 33 extends down from a lateral end of the main body 31 and then extends back from that extending end. The rotation preventing piece 33 is fit into a rotation preventing hole B3 formed on the body B to prevent rotation of the main body 31 during a bolting operation. A bolt fastening portion 34 is formed in the main body 31 before the rotation preventing piece 33.

The bolt fastening portion 34 has a bolt hole 35 through which the ground bolt B2 is insertable, and an unillustrated ground terminal is assembled with the bolt fastening portion 34. The ground bolt B2 is inserted through the bolt hole 35 and is tightening threadedly with the nut N to connect the conductive plate 30 and the ground terminal to the grounding location B1 of the body B.

Figure 2:
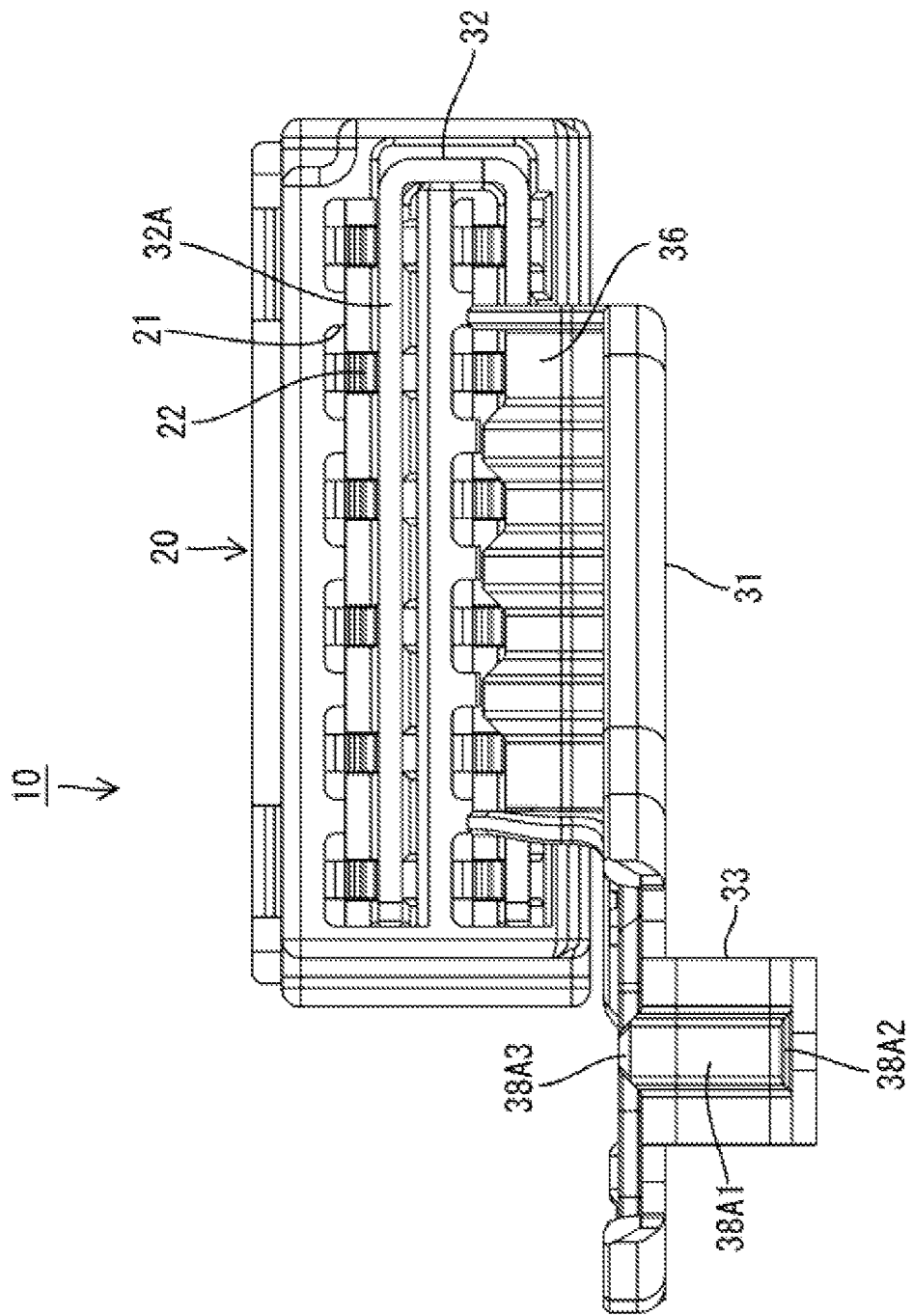
FIG. 2 is a rear view of the joint connector.

The connecting portion 32 has a substantially U-shaped coupling 32A that faces sideways, as shown in FIG. 2, and terminals 32B protrude forward on the front edge of the coupling 32A, as shown in FIGS. 3 and 7. Each terminal 32B is a flat tab and six terminals 32B are arranged side by side in the width direction in upper and lower rows. The terminals 32B are unitary with the coupling 32A. The terminals 32B and the couplings 32A are inserted into the corresponding cavities 21 of the housing 20 from behind (from left side of FIG. 7) and are retained, as shown in FIG. 7. Further, the coupling 32A is coupled to the front edge of the main body 31 via a step 36.

Ribs extend in forward and backward directions on the main body 31, as shown in FIG. 1. The ribs include a first rib group 37 in a range from the bolt fastening portion 34 to the connecting portion 32 in forward and backward directions, and a second rib group 38 in a range from the bolt fastening portion 34 to the rotation preventing piece 33. The rib groups 37, 38 project up by stamping parts of the main body 31.

The first rib group 37 has a first left rib 37A at a position closest to the bolt fastening portion 34, a first right rib 37C at a position most distant from the bolt fastening portion 34 and a first intermediate rib 37B between the ribs 37A and 37C. The first left rib 37A is longest in forward and backward directions in the first rib group 37, the first right rib 37C is second longest and the first intermediate rib 37B is shortest. The ribs 37A, 37B and 37C have equal widths. Further, the first rib group 37 extends from the main body 31 to the step 36.

The second rib group 38 has a main rib 38A arranged behind the bolt fastening portion 34, an auxiliary rib 38B perpendicularly intersecting with the main rib 38A and a sub rib 38C extending obliquely forward from the right end of the auxiliary rib 38B. The ribs 38A, 38B and 38C have equal widths. The main rib 38A extends in forward and backward directions in a range from the bolt fastening portion 34 to the rotation preventing piece 33. Further, the auxiliary rib 38B extends in the width direction and is behind the bolt fastening portion 34. A center of the sub rib 38C is coupled to the rear end of the first left rib 37A and a front end of the sub rib 38C is coupled to the rear end of the first right rib 37C.

The rotation preventing piece 33 has a vertical portion 33A extending down from the rear of the main body 31 and a horizontal portion 33B extending back from the lower end of the vertical portion 33A. The main rib 38A includes a vertical rib 38A1 on the vertical portion 33A, a horizontal rib 38A2 the horizontal portion 33B and a linking rib 38A3 between the upper end of the vertical rib 38A1 and a point of intersection with the auxiliary rib 38B. The linking rib 38A3 has a moderately tapered shape so that a projecting height is reduced toward the back. The vertical rib 38A1 and the horizontal rib 38A2 are continuous and have the same projecting height as the rear end of the linking rib 38A3.

One rib extends continuously from the horizontal rib 38A2 to the coupling 32A via the vertical rib 38A1, the linking rib 38A3, the sub rib 38C and the first right rib 37C. Thus, the rotation preventing piece 33 and the area of the main body 31 from the rotation preventing piece 33 to the coupling 32A are stronger.

The rotation preventing piece 33 includes the vertical portion 33A extending vertically from the peripheral edge of the main body 31 and the rib is continuous from the vertical portion 33A to the coupling 32A across the main body 31. Thus, the main body 31 is stronger from the vertical portion 33A of the rotation preventing piece 33 to the coupling 32A.

The rotation preventing piece 33 includes the horizontal portion 33B extending horizontally from the extending end of the vertical portion 33A and the rib is continuous from the horizontal portion 33B to the coupling 32A through the vertical portion 33A and the main body 31. Thus, the main body 31 is stronger from the horizontal portion 33B of the rotation preventing piece 33 to the coupling 32A.

A part of the rib on the rotation preventing piece 33 has a lower height than a part of the arranged on the main body 31. This lower height facilitates insertion of the rotation preventing piece 33 into the rotation preventing hole B3 on the body B.

A part of the rib near the rotation preventing piece 33 has a moderately inclined taper. Accordingly, a metal sheet will not become thinner by being suddenly pulled when forming the conductive plate 30 by press-working the metal sheet since the height of the rib does not change suddenly on the end part near the rotation preventing piece 33.

The invention is not limited to the above described embodiment. For example, the following embodiments also are included in the scope of the invention.

Although the rotation preventing piece 33 includes the horizontal portion 33b in the above embodiment, it may have only of the vertical portion 33A.

Although the linking rib 38A3 is formed into a moderately inclined tapered shape in the above embodiment, it may have a steeply inclined tapered shape.

What is claimed is:

1. A joint connector for collectively connecting wires to a body of a vehicle, comprising:
a housing; and
a conductive plate to be bolt-fastened to the body and having a main body with terminals in the housing and to be connected to female terminals at ends of the wires, the conductive plate including a coupling that couples the terminals to each other, a bolt fastening portion with a bolt hole through which a bolt is to be inserted, a rotation preventing portion provided at a side of the bolt fastening portion opposite the coupling and configured to prevent rotation of the main body, and a rib array continuous from the rotation preventing portion to the coupling across the main body.

2. The joint connector of claim 1, wherein the rotation preventing portion includes a vertical portion extending vertically from an end of the main body and the rib array being continuous from the vertical portion to the coupling across the main body.

3. The joint connector of claim 2, wherein the rotation preventing portion includes a horizontal portion extending horizontally from an extending end of the vertical portion and the rib array is continuous from the horizontal portion to the coupling across the vertical portion and the main body.

4. The joint connector of claim 1, wherein a part of the rib array on the rotation preventing portion has a lower height than a part of the rib array on the main body.

5. The joint connector of claim 4, wherein a part of the rib array on an area of the main body near the rotation preventing portion has a moderately inclined tapered shape.

* * * * *